(12) United States Patent
Choi et al.

(10) Patent No.: US 11,666,886 B2
(45) Date of Patent: Jun. 6, 2023

(54) HYDROCARBON ADSORPTION AND DESORPTION COMPLEX COMPRISING ZEOLITE WITH CONTROLLED CATION RATIO AND PREPARATION METHOD THEREFOR

(71) Applicant: Korea University Research and Business Foundation, Seoul (KR)

(72) Inventors: Jungkyu Choi, Seoul (KR); Kwan-Young Lee, Seoul (KR); Jinseong Kim, Seoul (KR); Eunhee Jang, Anyang-si (KR); Hwiyoon Noh, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/533,597

(22) Filed: Nov. 23, 2021

(65) Prior Publication Data

US 2022/0161226 A1 May 26, 2022

(30) Foreign Application Priority Data

Nov. 24, 2020 (KR) .................. 10-2020-0158371

(51) Int. Cl.
*B01J 20/18* (2006.01)
*F01N 3/08* (2006.01)
(Continued)

(52) U.S. Cl.
CPC .............. *B01J 20/18* (2013.01); *B01J 23/78* (2013.01); *F01N 3/0835* (2013.01); *F01N 3/101* (2013.01);
(Continued)

(58) Field of Classification Search
CPC combination set(s) only.
See application file for complete search history.

(56) References Cited

U.S. PATENT DOCUMENTS 6,235,255 B1 * 5/2001 Kharas .................... B01J 29/44
423/239.1
8,647,499 B2 2/2014 Simon
(Continued)

FOREIGN PATENT DOCUMENTS

JP          2966304 B2      10/1999
KR    10-1940410 B1       1/2019
(Continued)

OTHER PUBLICATIONS

Japanese Office Action dated Oct. 18, 2022, in counterpart Japanese Patent Application No. 2021-189493 (5 pages in Japanese).
(Continued)

*Primary Examiner* — Binh Q Tran
(74) *Attorney, Agent, or Firm* — NSIP Law

(57) ABSTRACT

Disclosed are a hydrocarbon adsorption and desorption complex showing hydrocarbon adsorption and oxidation performance by controlling the cation ratio in zeolite, and a preparation method therefor. The hydrocarbon adsorption and desorption complex controls a cation ratio to exhibit the excellent hydrocarbon adsorption ability and oxidation performance even at a temperature lower than the catalyst activation temperature, and increases hydrothermal stability of the hydrocarbon adsorption and desorption complex through hydrothermal treatment to exhibit the excellent hydrocarbon adsorption and desorption performance even in a situation where water is present at a high temperature.

15 Claims, 10 Drawing Sheets

(51) Int. Cl.
B01J 23/78 (2006.01)
F01N 3/10 (2006.01)

(52) U.S. Cl.
CPC ........ *F01N 3/0828* (2013.01); *F01N 2240/18* (2013.01); *F01N 2250/12* (2013.01); *F01N 2370/04* (2013.01); *F01N 2370/24* (2013.01); *F01N 2510/063* (2013.01); *F01N 2550/03* (2013.01); *F01N 2570/12* (2013.01)

(56) References Cited

U.S. PATENT DOCUMENTS

| | | | | |
|---|---|---|---|---|
| 2010/0322847 | A1* | 12/2010 | Xiao | C10G 11/05 423/709 |
| 2011/0313226 | A1* | 12/2011 | Yilmaz | C10G 3/49 423/709 |
| 2016/0030933 | A1* | 2/2016 | Ogura | B01D 53/864 423/700 |
| 2019/0358615 | A1* | 11/2019 | Sung | B01D 53/9468 |
| 2020/0338539 | A1* | 10/2020 | Kubota | B01J 29/76 |

FOREIGN PATENT DOCUMENTS

| | | |
|---|---|---|
| KR | 10-2019-0081424 A | 7/2019 |
| KR | 10-2085652 B1 | 3/2020 |

OTHER PUBLICATIONS

Joyner, Richard, and Michael Stockenhuber. "Preparation, characterization, and performance of Fe—ZSM-5 catalysts." *The Journal of Physical Chemistry B* 103.29 (Jul. 2, 1999): pp. 5963-5976.
Korean Office Action dated May 13, 2022 in counterpart Korean Patent Application No. 10-2020-0158371 (9 pages in Korean).

* cited by examiner

[FIG. 1]
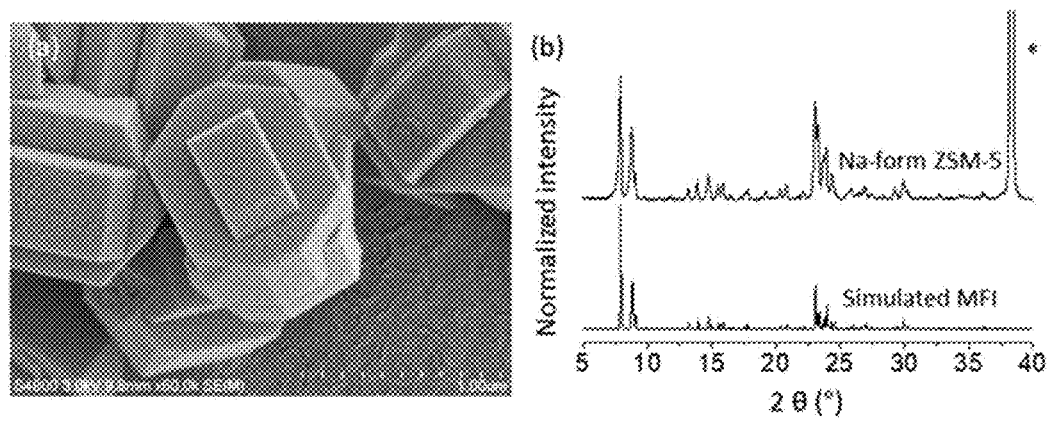
[FIG. 2]
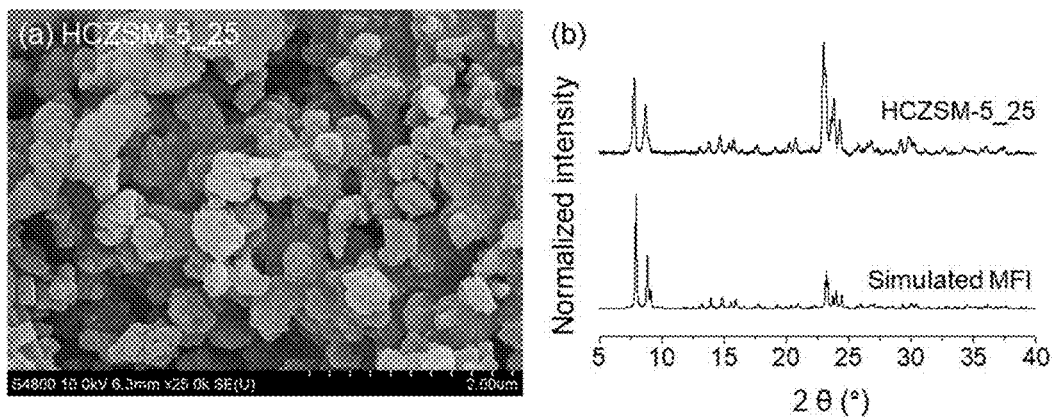

[FIG. 3]
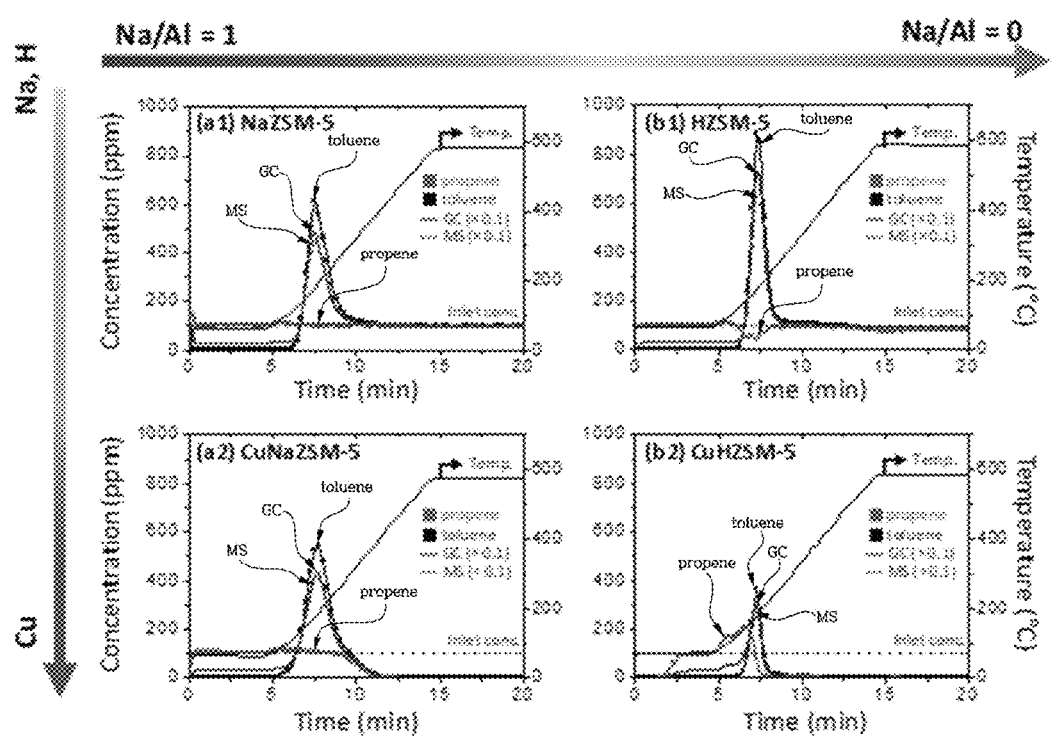

[FIG. 4]
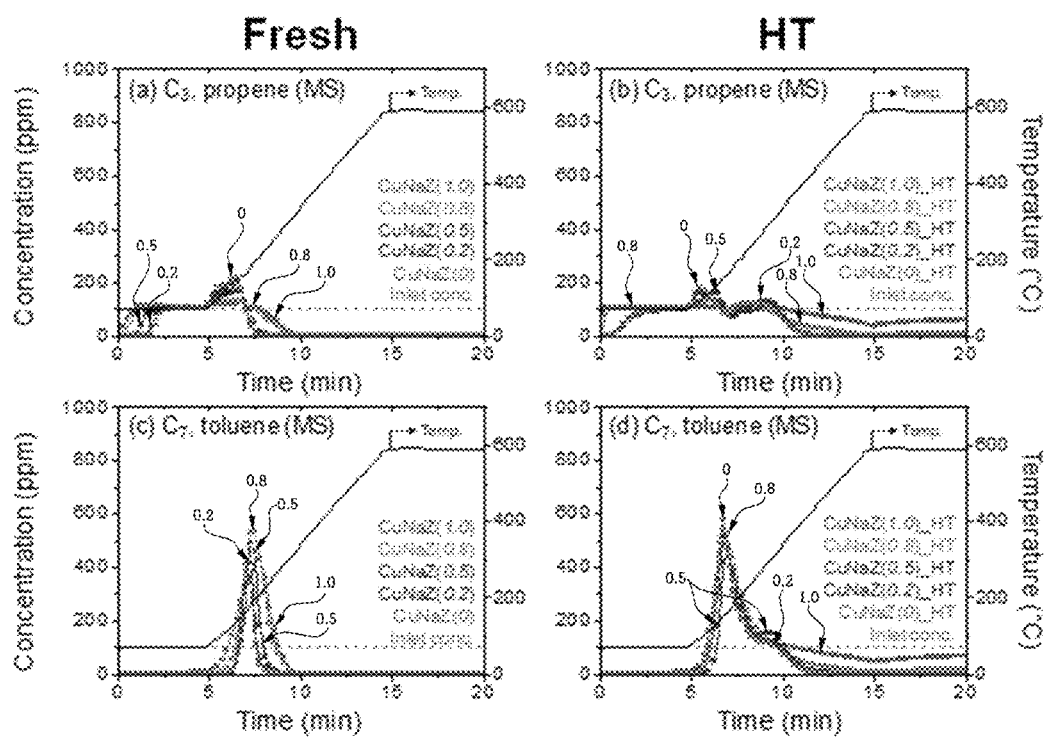

[FIG. 5]
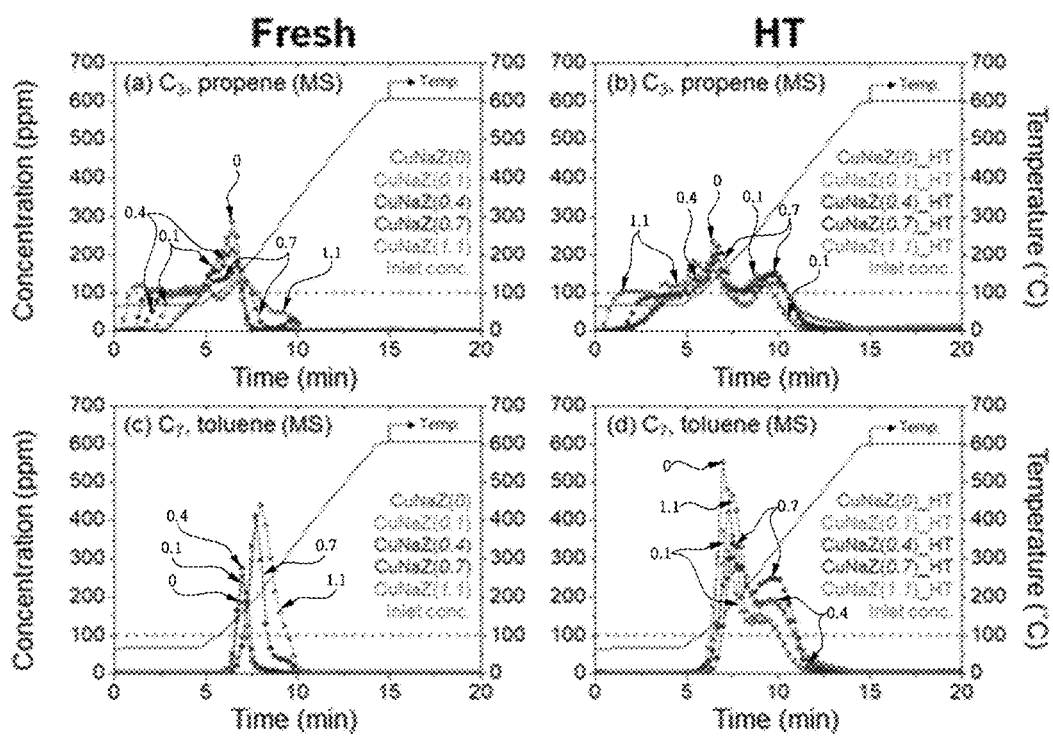

[FIG. 6]
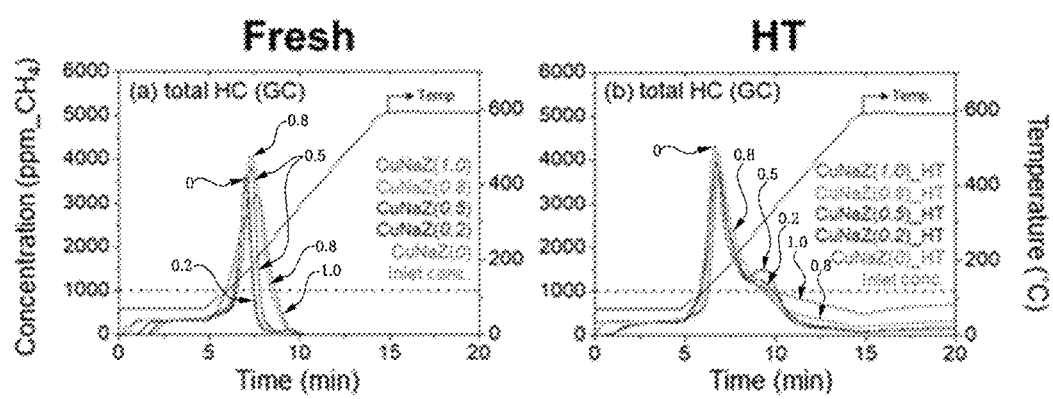
[FIG. 7]
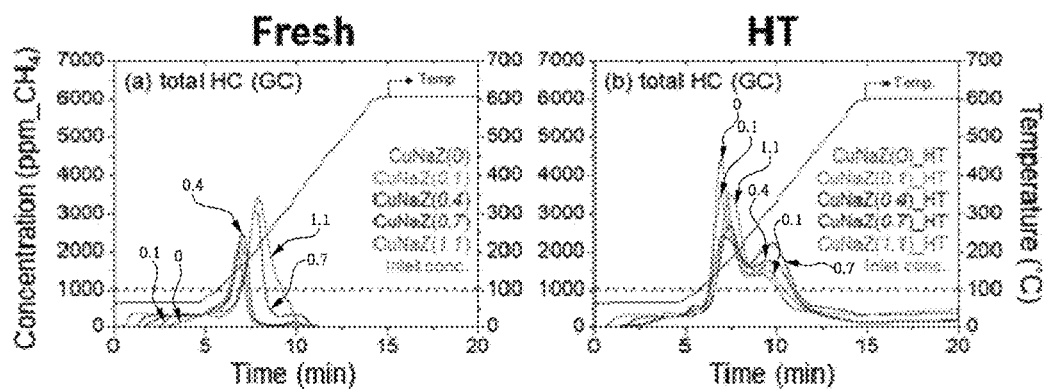

[FIG. 8]
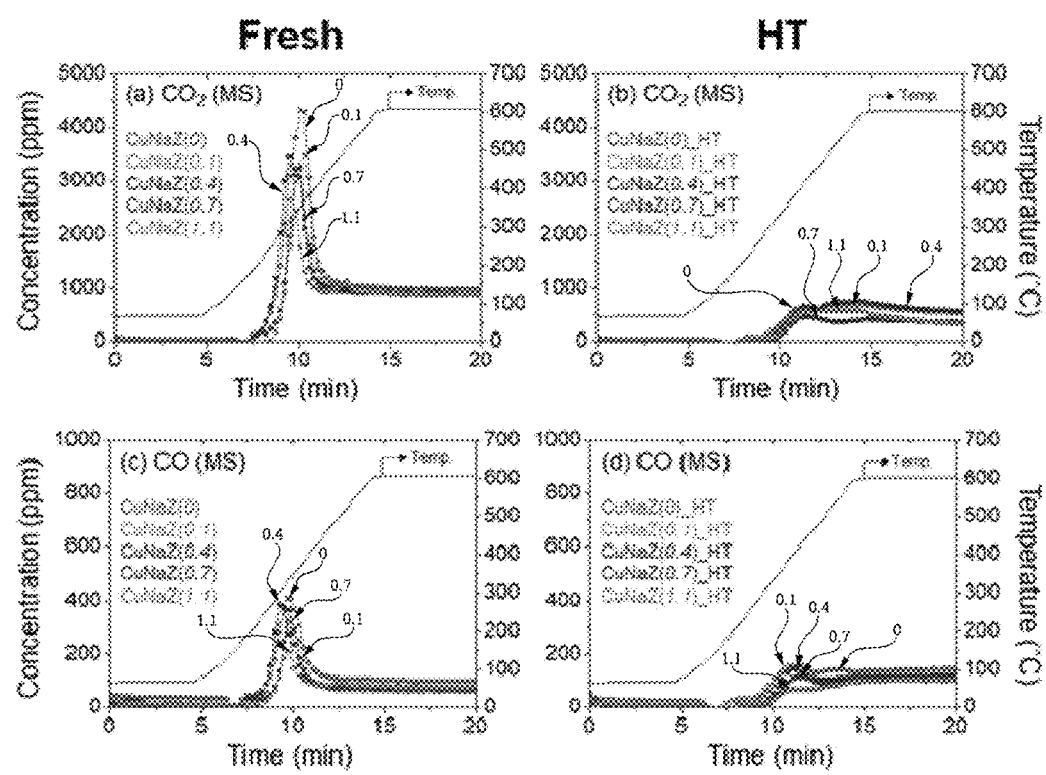

[FIG. 9]
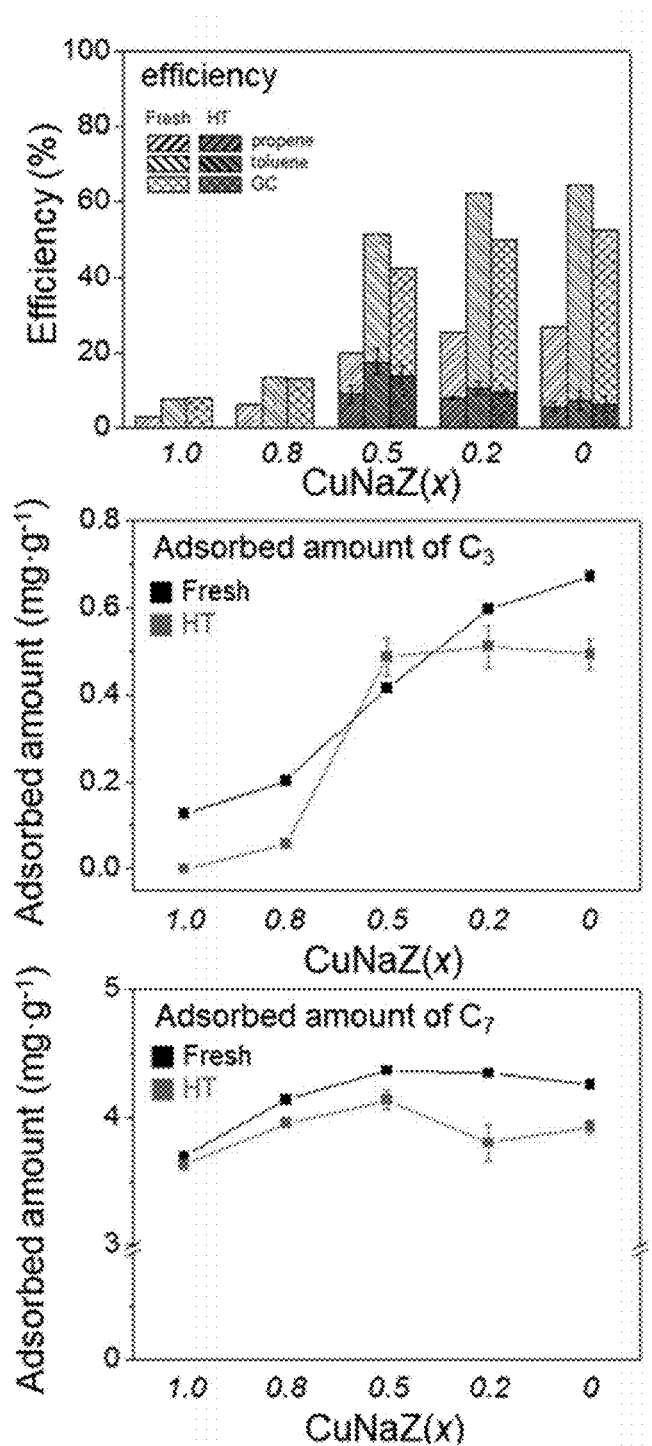

[FIG. 10]
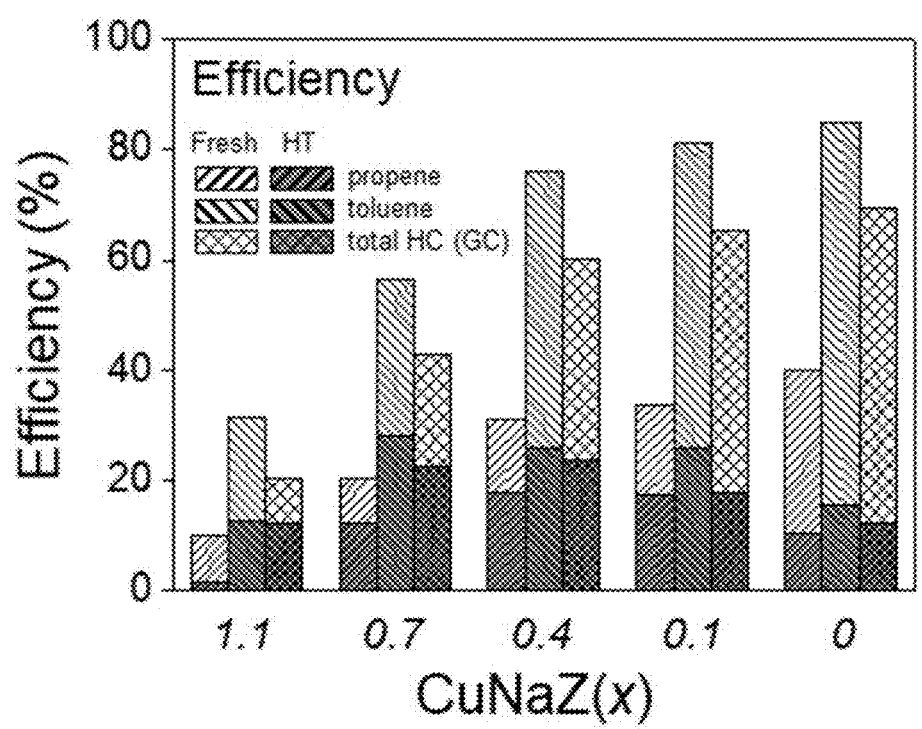

[FIG. 11]
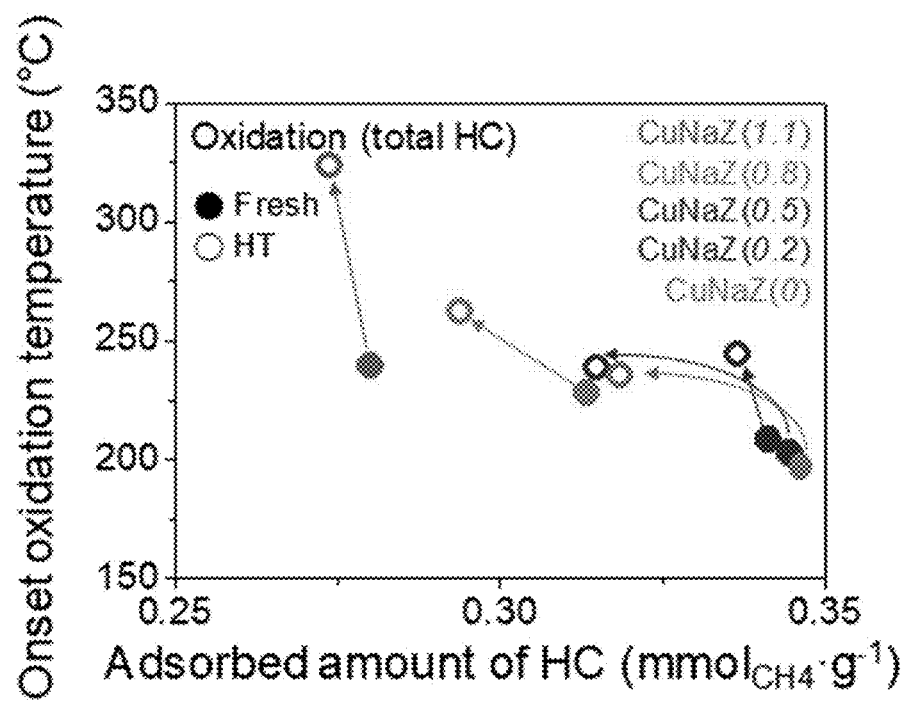

[FIG. 12]
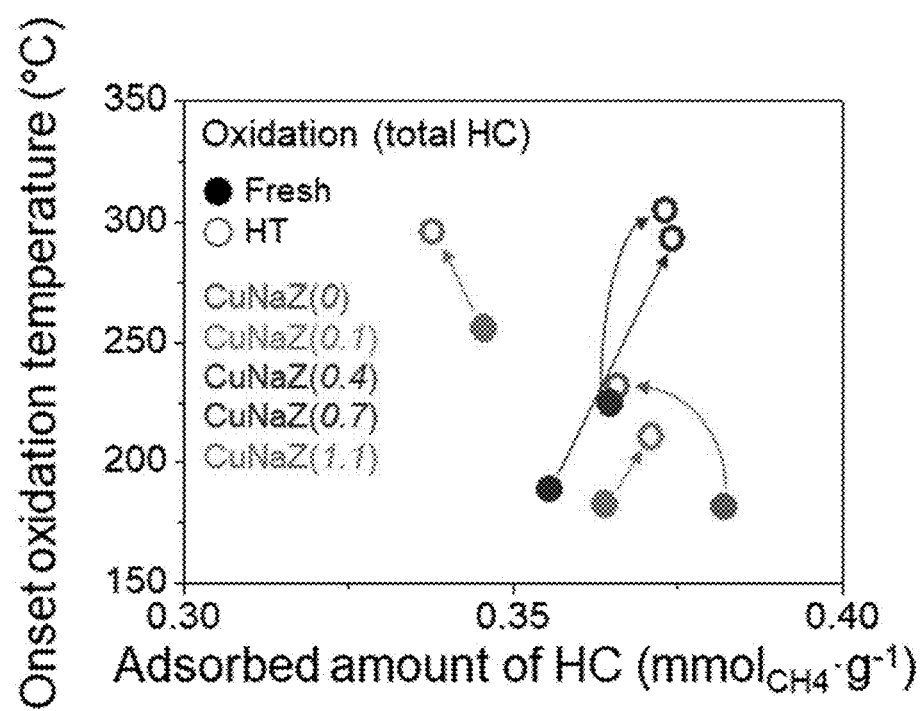

HYDROCARBON ADSORPTION AND DESORPTION COMPLEX COMPRISING ZEOLITE WITH CONTROLLED CATION RATIO AND PREPARATION METHOD THEREFOR

CROSS-REFERENCE TO RELATED APPLICATION

This application claims a benefit under 35 U.S.C. § 119(a) of Korean Patent Application No. 10-2020-0158371 filed on Nov. 24, 2020, in the Korean Intellectual Property Office, the entire disclosure of which is incorporated herein by reference for all purposes.

TECHNICAL FIELD

The present disclosure relates to a hydrocarbon adsorption and desorption complex comprising zeolite, and more particularly, to a hydrocarbon adsorption and desorption complex in which metal ions and metal oxides formed on zeolite are effectively dispersed by controlling a cation ratio in zeolite, and a preparation method therefor.

BACKGROUND ART

With the growing interest in air pollution, the regulations concerning exhaust gases such as carbon monoxide (CO), nitrogen oxides (NOx), hydrocarbons (HC), particulate matter (PM), or the like emitted from gasoline and diesel vehicles are being tightened in the United States, Europe, etc. In particular, with time from Euro 1 in 1992 to Euro 6d in 2020, hydrocarbon (HC) emissions should be reduced by at least up to 80% compared to 1992. In the case of HC emission from gasoline vehicles, 50 to 80% of hydrocarbons emitted during operation are emitted in the cold start period when three-way catalysts (TWCs, acting on HC oxidation) are not active. Research on hydrocarbon adsorbents (HC traps) is in progress in order to reduce hydrocarbons emitted during the cold start period. The HC trap is a device for adsorbing hydrocarbons emitted in the cold start period and desorbing already adsorbed hydrocarbons when the three-way catalyst reaches the activation temperature (approximately 200 to 300° C.).

A lot of research is being conducted on the use of zeolites with physical and chemical stability as the HC trap. The performance of the HC trap is tested by measuring the adsorption and desorption of propene and toluene, which are representative hydrocarbon emissions of gasoline vehicles. Research on the performance of the HC trap has been conducted based on a zeolite structure, Si/Al values, and present or absence of metal impregnation. The higher the Al content of the zeolite (that is, the smaller the Si/Al value), the more hydrocarbons are adsorbed to the zeolite. In addition, among various zeolite structures, ZSM-5 and beta-structured zeolites show high performance. However, the HC trap made of only zeolite has low adsorption and oxidation ability for hydrocarbons at 300° C. or lower, which may lead to problems of insufficient treatment of hydrocarbons generated in the cold start period until the three-way catalyst reaches the activation temperature, and furthermore, deterioration in the performance of the HC trap when a large amount of water (approximately 10 mol %) is present.

In order to solve the above-mentioned problems, there is a need for the development of an adsorbent that adsorbs and oxidizes hydrocarbons at a temperature lower than the activation temperature of the three-way catalyst and that exhibits excellent hydrocarbon adsorption and oxidation ability even in the presence of a large amount of water.

An example of the related art is disclosed in Japanese Unexamined Patent Application Publication No. 2012-512022 (Date: May 31, 2012).

DISCLOSURE OF THE INVENTION

Technical Problem

An object of the present disclosure is to provide a hydrocarbon adsorption and desorption complex showing hydrocarbon adsorption and oxidation performance by controlling the cation ratio in zeolite, and a preparation method therefor.

Technical Solution

According to an aspect of the present disclosure, there is provided a hydrocarbon adsorption and desorption complex including: zeolite particles containing cations; metal ions chemically bounded to the zeolite particles; and metal oxides provided on outer surface of the zeolite particles, in which the cations include cations of sodium and hydrogen, and a molar ratio of sodium to aluminum (Na/Al) of the zeolite particle is 0.7 or less.

According to another aspect of the present disclosure, there is provided a preparation method for a hydrocarbon adsorption and desorption complex, including:

controlling a cation ratio in zeolite particles by using an ion exchange method; and forming metal ions and metal oxides by mixing the zeolite particles with the controlled cation ratio with a solution containing the metal ions, in which, in the controlling of the cation ratio, a molar ratio of sodium to aluminum (Na/Al) of the zeolite particles is controlled to 0.7 or less.

According to still another aspect of the present disclosure, there is provided a hydrocarbon adsorption and desorption complex for vehicles including the hydrocarbon adsorption and desorption complex according to the aspect described above.

Advantageous Effects

The hydrocarbon adsorption and desorption complex according to the present disclosure may control the cation ratio, thereby making it possible to exhibit the excellent hydrocarbon adsorption ability and oxidation performance even at a temperature lower than the catalyst activation temperature.

Further, the hydrocarbon adsorption and desorption complex according to the present disclosure may increase hydrothermal stability, thereby making it possible to exhibit the excellent hydrocarbon adsorption and desorption performance even after undergoing a hydrothermal treatment process by which a high temperature is applied in the presence of water.

BRIEF DESCRIPTION OF THE DRAWINGS

FIGS. 1 and 2 show images of a hydrocarbon adsorption and desorption complex according to an embodiment of the present disclosure captured with a scanning electron microscope (SEM) and an X-ray diffraction analysis (XRD) graphs.

FIG. 3 shows graphs of cool start test results of the hydrocarbon adsorption and desorption complex according to an embodiment of the present disclosure.

FIGS. 4 and 5 show graphs of cool start test results for propene and toluene of the hydrocarbon adsorption and desorption complexes according to an embodiment of the present disclosure.

FIGS. 6 and 7 show graphs of cool start test results for a total hydrocarbon adsorbed amount of the hydrocarbon adsorption and desorption complexes according to an embodiment of the present disclosure.

FIG. 8 shows graphs of cool start test results for carbon monoxide and carbon dioxide of the hydrocarbon adsorption and desorption complexes according an embodiment of the present embodiment.

FIGS. 9 and 10 show graphs of a treatment efficiency for propene, toluene, and total hydrocarbons and adsorbed amounts of propene and toluene with respect to a molar ratio of sodium to aluminum and with or without hydrothermal treatment, in the hydrocarbon adsorption and desorption complex according to an embodiment of the present disclosure.

FIGS. 11 and 12 show graphs of the total hydrocarbon adsorbed amount and an onset oxidation temperature of the hydrocarbon adsorption and desorption complexes according to an embodiment of the present disclosure.

MODE FOR CARRYING OUT THE INVENTION

Hereinafter, in order to describe the present disclosure more specifically, preferred embodiments according to the present disclosure will be described in more detail with reference to the accompanying drawings. However, the present disclosure is not limited to the embodiments described herein and may be embodied in other forms.

In the present specification, 'total hydrocarbons' refer to hydrocarbons based on methane. Specifically, total hydrocarbons are obtained by converting propene, toluene, or the like into values corresponding to methane through gas chromatography (GC FID), and quantifying the converted values as the amount of methane.

Until now, HC traps have been reported in which copper-impregnated zeolite is provided through an ion exchange process, or ion exchange is performed using a larger amount of copper and some remaining copper is present in the form of copper oxide, in order to improve hydrocarbon adsorption performance.

The development of HC traps in the related art has been studied by controlling the Si/Al value, structure, and type of impregnated metal of zeolite; however, the present disclosure relates to an HC trap having excellent hydrocarbon adsorption and oxidation ability by controlling the distribution of metal ions and metal oxides through the control of the ratio of cations present in an active site of the same type of zeolite.

The present disclosure provides a hydrocarbon adsorption and desorption complex: including zeolite particles;

metal ions chemically bounded to the zeolite particles; and metal oxides provided on outer surfaces of the zeolite particles, in which the cations include cations of sodium and hydrogen, and a molar ratio of sodium to aluminum (Na/Al) of the zeolite particles is 0.7 or less.

The zeolite particle may be a zeolite socony mobil-5 (ZSM-5) zeolite.

Specifically, the molar ratio of sodium to aluminum (Na/Al) of the zeolite particles may be 0.6 or less, 0.01 to 0.6, 0.1 to 0.5, or 0.2 to 0.5. Including the zeolite particles having the above-mentioned molar ratio of sodium to aluminum may make the cool start performance excellent even during a hydrothermal treatment and accordingly, high the adsorption ability and hydrocarbon oxidation ability may be achieved even in the presence of water. The sodium and hydrogen cations are chemically bounded to the zeolite active site.

The zeolite is zeolite having an Si/Al value of approximately 25, to the active site of which cations are bounded. When cations are bound to the zeolite active site as described above, the content of metal ions bound in pores of the zeolite is high, and the size of the metal oxides formed on the surface of the zeolite is small, and accordingly the adsorption performance of the hydrocarbon adsorption and desorption complex is improved.

The size of the hydrocarbon adsorption and desorption complex may be 50 to 5000 nm. Specifically, the size of the hydrocarbon adsorption and desorption complex may be 50 to 2000 nm or 300 to 1500 nm.

In addition, the hydrocarbon adsorption and desorption complex is one in which fine pores are formed in the zeolite particles, metal ions are impregnated inside the pores formed in the zeolite particles, and metal oxides are provided on the surfaces of the zeolite particles. Specifically, the volume of the micropores of the hydrocarbon adsorption and desorption complex may be 0.1 to 0.2 $cm^3/g$, 0.1 to 0.15 $cm^3/g$, or 0.12 to 0.13 $cm^3/g$. With the micropores formed in the zeolite particles and metal ions impregnated into the micropores as described above, the adsorption ability for hydrocarbons such as propene and toluene may be improved.

The metal ions may be cations of any one or more metals of elements of Groups 3 to 12. Specifically, the metal ions may be cations of any one or more metals of iron, cobalt, nickel, copper, zinc, rhodium, and cadmium. More specifically, the metal ions may be cations of monovalent iron, divalent iron, trivalent iron, monovalent cobalt, divalent cobalt, monovalent nickel, divalent nickel, monovalent copper, or divalent copper. The metal ions may be bounded inside the pores formed in the zeolite particles to improve the hydrocarbon adsorption ability.

The metal oxides may be oxides of any one or more metals of elements of Groups 3 to 12. Specifically, the metal oxides may be oxides of any one or more metals of iron, cobalt, nickel, copper, zinc, rhodium, and cadmium. More specifically, the metal oxide may be $FeO$, $Fe_3O_4$, $Fe_2O_3$, $Co_3O_4$, $CoO$, $NiO$, $Cu_2O$, $Cu_2O_3$, or $CuO$.

For example, the metal oxides are formed on zeolite particles, and may have an average diameter of 1 to 10 nm. Specifically, the average diameter of the metal oxides may be 1 to 9 nm, 1 to 7 nm, 2 to 8 nm, or 2 to 6 nm. By forming the metal oxides on the zeolite particles as described above, the hydrocarbon adsorption and desorption complex according to the present disclosure may have low hydrocarbon oxidation temperature and high hydrothermal stability.

In the hydrocarbon adsorption and desorption complex according to the present disclosure, a volume $V_1$ of the micropore having a size of 1 nm or less may be of 0.1 $cm^3/g$ or more, the metal cations may be present in an amount of 50 to 90% of the maximum weight that may be impregnated into the zeolite, and the metal oxides may be present in an amount of 60 to 80% of the maximum weight that may be impregnated into the zeolite.

The hydrocarbon adsorption and desorption complex according to the present disclosure, which has the above characteristics, may satisfy the following Formula 1:

$$\left[1 - \frac{Q_{Out}}{Q_{In}}\right] \times 100 > A \quad \text{[Formula 1]}$$

where $Q_{In}$ represents the amount of hydrocarbons injected into the hydrocarbon adsorption and desorption complex, $Q_{Out}$ represents the amount of hydrocarbons released through the hydrocarbon adsorption and desorption complex, and A is a number of 40 or more, and represents a hydrocarbon treatment efficiency.

a Formula 1 is obtained by measuring the amount of hydrocarbons injected into the hydrocarbon adsorption and desorption complex and the amount of hydrocarbons released from the hydrocarbon adsorption and desorption complex, and calculating the hydrocarbon adsorption ability of hydrocarbon adsorption and desorption complex through the ratio between the amount of hydrocarbons injected into the hydrocarbon adsorption and desorption complex and the amount of hydrocarbons released through the hydrocarbon adsorption and desorption complex until the time when the temperature reaches 300° C. In this case, the hydrocarbon treatment efficiency A may represent 40 or more, 45 or more, 50 or more, 55 or more, or 60 or more.

In addition, the hydrocarbon adsorption and desorption complex according to the present disclosure may represent the adsorption of hydrocarbons at a temperature of 300° C. or less, and may represent the oxidation of hydrocarbons at a temperature of 200° C. or more. Specifically, the hydrocarbon adsorption and desorption complex of the present disclosure may represent the adsorption of hydrocarbons at a temperature of 70° C. to 300° C. or 100° C. to 300° C., or may represent the oxidation of hydrocarbons at a temperature of 210° C. or more, 220° C. or more, 230° C. or more, 240° C. or more, or 250° C. or more. Usually, 50 to 80% of total hydrocarbons emitted during travelling occur in the cold start period (300° C. or less), and due to the above characteristics, the hydrocarbon adsorption and desorption complex according to the present disclosure may efficiently adsorb and oxidize hydrocarbons even in the cold start period, and exhibit high hydrothermal stability.

In addition, the hydrocarbon adsorption and desorption complex according to the present disclosure may have a hydrocarbon adsorption amount of 0.32 to 1.5 mmol$_{CH4}$/g, and a hydrocarbon oxidation start temperature of 180 to 350° C. Specifically, the hydrocarbon adsorption and desorption complex of the present disclosure may have the adsorbed amount of hydrocarbons of 0.32 to 1.0 mmol$_{CH4}$/g, 0.32 to 0.8 mmol$_{CH4}$/g, or 0.32 to 0.4 mmol$_{CH4}$/g, and may have the hydrocarbon oxidation start temperature of 180 to 320° C., 180 to 300° C. or 180 to 250° C. In this case, the oxidation start temperature refers to the temperature at which the amount of $CO_2$ produced is 5% or more of the total hydrocarbons.

The hydrocarbon adsorption and desorption complex according to the present disclosure may be hydrothermally treated at 600° C. to 900° C. for one hour to 36 hours. Specifically, the HC trap may be hydrothermally treated at a temperature of 600° C. to 850° C., 600° C. to 800° C., 600° C. to 750° C. or 700° C. to 800° C. for one hour to 24 hours, 12 hours to 36 hours, or 12 hours to 24 hours. At this time, an hourly gas flow rate of a simulated exhaust gas including water vapor to the weight of the hydrocarbon adsorption and desorption complex may be 10,000 to 200,000 mL/g·h or 100,000 to 200,000 mL/g·h, which is a severe condition similar to that when a vehicle is operated for a long time. The hydrothermal-treated hydrocarbon adsorption and desorption complex as described above may have reduced performance of adsorbing and oxidizing hydrocarbons in the presence of water vapor, and may have reduced durability.

For example, in the hydrothermal-treated hydrocarbon adsorption and desorption complex, A, which is the hydrocarbon treatment efficiency in Formula 1, may be 5 or more, 10 or more, 15 or more, 20 or more, 25 or more, or 30 or more. The hydrothermal-treated hydrocarbon adsorption and desorption complex exhibits a relatively low hydrocarbon treatment efficiency compared to the hydrocarbon adsorption and desorption complex that is not subjected to hydrothermal treatment (fresh hydrocarbon adsorption and desorption complex); however, in the comparison after the hydrothermal treatment, the hydrocarbon adsorption and desorption complex having a molar ratio of sodium to aluminum (Na/Al) of 0.7 or less exhibits an improved heat resistance and a more excellent hydrocarbon treatment efficiency than the hydrocarbon adsorption and desorption complex having a molar ratio of sodium to aluminum (Na/Al) of 0.7 or more.

In addition to hydrocarbon adsorption performance, the hydrocarbon adsorption and desorption complex according to the present disclosure may be utilized as a selective catalytic reduction (SCR), and in this case, may effectively remove nitrogen oxides ($NO_x$), and thus exhibit air purification ability.

The present disclosure provides a preparation method for a hydrocarbon adsorption and desorption complex, the preparation method including: controlling a cation ratio in zeolite particles by using an ion exchange method; and forming metal ions and metal oxides by mixing the zeolite particles with the controlled cation ratio with a solution containing the metal ions, in which in the controlling of the cation ratio, a molar ratio of sodium to aluminum (Na/Al) of the zeolite particles is controlled to 0.7 or less.

The zeolite particle may be a zeolite socony mobil-5 (ZSM-5) zeolite.

In the controlling of the cation ratio, the zeolite may include a hydrogen cation-containing zeolite (H-form zeolite) and a sodium cation-containing zeolite (Na-form zeolite). Zeolite in which the molar ratio of sodium to aluminum (Na/Al) is controlled is prepared by replacing sodium cations in the active site of the zeolite with hydrogen cations or replacing hydrogen cations with sodium cations using a method of calcining a zeolite precursor after ion exchange.

The controlling of the cation ratio may include mixing an ammonium salt aqueous solution or a sodium salt aqueous solution with the zeolite particles, the ammonium salt aqueous solution may contain any one or more of ammonium sulfate, ammonium nitrate, ammonium chloride, ammonium acetate, ammonium persulfate, aqueous ammonia, ammonium bicarbonate, and ammonium formate, and the sodium salt aqueous solution may include any one or more of sodium nitrate, sodium chloride, sodium acetate, sodium persulfate, sodium bicarbonate, and sodium formate.

The ammonium salt aqueous solution may be mixed with the sodium cation-containing zeolites (Na-form zeolite), and when the ammonium salt aqueous solution and the sodium cation-containing zeolites are mixed, the ammonium ions are replaced with the sodium cations contained in the zeolite.

Then, through the calcining process, the replaced ammonium ions are changed into hydrogen ions. In this way, the molar ratio of sodium to aluminum of the zeolite particles may be decreased, and the molar ratio of sodium to aluminum of the zeolite particles may be controlled by controlling the concentration of the ammonium salt aqueous solution and the reaction time between the ammonium salt aqueous solution and the zeolite particles.

The sodium salt aqueous solution may be mixed with the hydrogen cation-containing zeolite (H-form zeolite), and when the sodium salt aqueous solution and the hydrogen cation-containing zeolite are mixed, the sodium cations are replaced with the ammonium ions contained in the zeolite. Then, through the calcining process, the ammonium ions of the zeolite particles are changed to hydrogen ions. In this way, the molar ratio of sodium to aluminum of the zeolite particles may be increased, and the molar ratio of sodium to aluminum of the zeolite particles may be controlled by controlling the concentration of the sodium salt aqueous solution and the reaction time between the sodium salt aqueous solution and the zeolite particles.

Specifically, the concentration of the ammonium salt aqueous solution may be 0.001 M to 1 M, 0.005 M to 1 M, or 0.001 M to 0.9 M, and the ammonium salt aqueous solution and the zeolite particles may be mixed and stirred at a temperature of 20° C. to 30° C. for 20 hours to 30 hours, 25 hours to 30 hours, or 20 hours to 25 hours. As described above, when the ammonium salt aqueous solution and the zeolite particles are stirred for a predetermined time to control the molar ratio of sodium to aluminum of the zeolite particles, the hydrothermal stability of the prepared hydrocarbon adsorption and desorption complex may be improved.

Specifically, the concentration of the sodium salt aqueous solution may be 0.001 M to 1 M, 0.005 M to 1 M, or 0.001 M to 0.9 M, and the mixture of the sodium salt aqueous solution and the zeolite particles may be mixed and stirred at a temperature of 20° C. to 30° C. for 20 hours to 30 hours, 25 hours to 30 hours, or 20 hours to 25 hours. As described above, when the sodium salt aqueous solution and the zeolite particles are stirred for a predetermined time to control the molar ratio of sodium to aluminum of the zeolite particles, the hydrothermal stability of the prepared hydrocarbon adsorption and desorption complex may be improved.

In the hydrocarbon adsorption and desorption complex prepared by the prepared method according to the present disclosure, the molar ratio of sodium to aluminum (Na/Al) of the zeolite particles may be 0.6 or less, 0.01 to 0.6, 0.1 to 0.5, or 0.2 to 0.5. Forming the zeolite particles having the above-mentioned molar ratio of sodium to aluminum may make the cool start test performance excellent even during a hydrothermal treatment and accordingly, relatively high the adsorption ability and hydrocarbon oxidation ability may be achieved even in the presence of water.

For the zeolite particles with the cation ratio controlled as described above, the ratio of sodium cation-containing zeolites may be 70% or less, 60% or less, 1% to 60%, 10% to 50%, or 20% to 50%.

Then, a method is performed once or twice or more repeatedly in which centrifugation and decantation of a mixed solution of zeolite particles and the ammonium salt aqueous solution are performed to obtain a precipitate, and the obtained precipitate is mixed with the ammonium salt aqueous solution to obtain a precipitate again.

The obtained precipitate may be calcined at a temperature of 500 to 700° C. for 10 hours to 20 hours under an air flow of 300 mL/min. Specifically, calcination may be performed by heating the obtained precipitate at a temperature of 500 to 650° C. or 500 to 600° C. under an airflow of 300 mL/min at a ramp rate of approximately 1° C./min for 10 hours to 17 hours or 10 hours to 15 hours. Through the above process, zeolite particles with a controlled sodium cation ratio may be prepared, and micropores may be formed in the zeolite particles.

The zeolite is zeolite having an Si/Al value of approximately 25, to the active site of which hydrogen and sodium cations are bounded. When cations of the zeolite active site is replaced with hydrogen cations as described above, the content of impregnated metal ions is increased, which may lead to the improvement in adsorption performance, and the size of the metal oxides formed on the surface of the zeolite is reduced, which may lead to the improvement in oxidation performance of the HC trap.

The forming of the metal ions and the metal oxides may include impregnating a metal precursor solution containing metal ions with the zeolite particles with a controlled molar ratio of sodium to aluminum by using a wet impregnation method, where the content of the metal may be 1 to 9 wt. %, 2 to 8 wt. %, 3 to 8 wt. %, or 4 to 7 wt. %. Additionally, drying and calcining may be further included.

Specifically, in the forming of the metal ions and the metal oxides, the zeolite particles may be impregnated with metal ions and metal oxides by calcining the zeolite particles impregnated with metal precursor using a wet impregnation method at a temperature of 500 to 700° C. for two to 10 hours under the airflow of 300 mL/min. Specifically, calcination may be performed by heating the zeolite particles impregnated with metal precursor at a temperature of 500 to 650° C. or 500 to 600° C. under the airflow of 300 mL/min at a ramp rate of approximately 1° C./min for two to eight hours or three to seven hours. Through the above process, the zeolite particles with the controlled molar ratio of sodium to aluminum may include metal ions and metal oxides, and more specifically, metal ions may be impregnated into the micropores of the zeolite particles and metal oxides may be formed on the surfaces of the zeolite particles.

The metal ions may include cations of any one or more metals of elements of Groups 3 to 12. Specifically, the metal ions include cations of any one or more metals of iron, cobalt, nickel, copper, zinc, rhodium, and cadmium. Specifically, the metal ions may be cations of monovalent iron, divalent iron, trivalent iron, monovalent cobalt, divalent cobalt, monovalent nickel, divalent nickel, monovalent copper, or divalent copper.

The metal oxides formed by impregnating the solution containing the metal ions into the zeolite may be oxides of any one or more metals of elements of Groups 3 to 12. Specifically, the metal oxides may be oxides of any one or more metals of iron, cobalt, nickel, copper, zinc, rhodium, and cadmium. Specifically, the metal oxide may be FeO, $Fe_3O_4$, $Fe_2O_3$, $Co_3O_4$, CoO, NiO, $Cu_2O$, $Cu_2O_3$, or CuO.

The metal oxides may be formed on the zeolite particles through the forming of the metal ions and the metal oxides, and the average diameter of the formed metal oxides may be 1 to 10 nm. Specifically, the average diameter of the metal oxides may be 1 to 9 nm, 1 to 7 nm, 2 to 8 nm, or 2 to 6 nm. By impregnating the metal ions into the zeolite particles and forming the metal oxides on the zeolite particles as described above, the HC trap according to the present disclosure may have excellent hydrocarbon adsorption performance, low hydrocarbon oxidation temperature, and high hydrothermal stability.

The HC trap prepared through the above process has micropores having a size of 1 nm or less with a volume ($V_1$) of 0.1 cm³/g or more, 0.1 to 0.2 cm³/g, 0.1 to 0.15 cm³/g, or 0.12 to 0.13 cm³/g, the metal cations may be present in an amount of 50 to 80% of the maximum weight that may be impregnated into the zeolite, and the metal oxides may be formed by remaining metals that are not impregnated into the zeolite as metal cations.

The preparation method for the HC trap according to the present disclosure further includes, after the forming of the metal ions and the metal oxides, performing hydrothermal treatment by injecting 5 to 15 mol % of water vapor at a temperature of 600° C. to 900° C. for one hour to 36 hours. Specifically, the hydrothermal treatment may be performed by thermally treating injected 5 to 15 mol % of water vapor at a temperature of 600° C. to 800° C., 600° C. to 750° C., 600° C. to 700° C., or 700° C. to 800° C. for one hour to 24 hours, 12 hours to 36 hours, or 12 hours to 24 hours. At this time, an hourly gas flow rate of the water vapor to the weight of the hydrocarbon adsorption and desorption complex may be 10,000 to 200,000 mL/g·h or 100,000 to 200,000 mL/g·h, which is a severe condition similar to those applied to the HC trap when a vehicle travels for a long time.

The hydrocarbon adsorption and desorption complex obtained through the hydrothermal treatment exhibits a relatively low hydrocarbon treatment efficiency compared to the fresh hydrocarbon adsorption and desorption complex; however, in the comparison after the hydrothermal treatment, the hydrocarbon adsorption and desorption complex having a molar ratio of sodium to aluminum (Na/Al) of 0.7 or less exhibits a more improved heat resistance and an excellent hydrocarbon treatment efficiency than the hydrocarbon adsorption and desorption complex having a molar ratio of sodium to aluminum (Na/Al) of 0.7 or more.

In addition, the present disclosure provides a hydrocarbon adsorption and desorption complex for vehicles including the hydrocarbon adsorption and desorption complex according to the aspect described above. The hydrocarbon adsorption and desorption complex according to the present disclosure exhibits excellent hydrocarbon adsorption and exhibits hydrocarbon oxidation at a temperature of approximately 200° C., and thus the adsorbed hydrocarbon is oxidized even at a relatively low temperature, and hydrothermal stability is ensured at a high temperature. Therefore, the hydrocarbon adsorption and desorption complex according to the present disclosure may be applied to the removal of hydrocarbons emitted from automobile exhaust gas, and may produce an atmospheric purification effect by showing excellent hydrocarbon adsorption and oxidation ability even in the cold start period before the three-way catalyst is sufficiently active.

Hereinafter, examples of the present disclosure will be described. However, the following examples are only preferred examples of the present disclosure, and the scope of the present disclosure is not limited by the following examples.

EXAMPLES

Example 1 (CuNaZ(0.5))

Synthesis of NaZ 2.25 g of water was added to 3.75 g of tetrapropylammonium hydroxide (TPAOH, 40 wt. % in $H_2O$, Sigma-Aldrich) and stirred for approximately 10 minutes. Then, 6.25 g of tetraethyl orthosilicate (TEOS, 98%, Sigma-Aldrich) was added dropwise. This was called mixture A. Another mixture B contained 1.81 g of water, 0.45 g of aluminum nitrate nonahydrate ($Al(NO_3)_3 \cdot 9H_2O$, Sigma-Aldrich), and 0.12 g of sodium hydroxide (NaOH, Sigma-Aldrich). Mixture B was added to mixture A and sealed with autoclave. Then, it was placed in an oven preheated to 160° C. and hydrothermal synthesis was performed for 24 hours. Then, washing was performed four times with deionized water to remove impurities, and vacuum filtering was performed using 500 mL of water to remove sodium that was not included in the zeolite structure. Then, drying was performed at 70° C. overnight and calcining was performed at 550° C. for 12 hours under the airflow of 300 mL/min. The shape and composition thereof were confirmed through a scanning electron microscope image and an X-ray diffraction analysis graph of FIG. 1. Referring to FIG. 1, it can be seen that zeolite particles having micropores on the surfaces are identified through the scanning electron microscope image, and it can be seen that the zeolite particles have an MFI-type structure through the X-ray diffraction analysis graph.

Synthesis of NaZ(0.5)

Then, the molar ratio of sodium to aluminum of the zeolite particles was controlled through an ion exchange process. Specifically, 1 g of calcined sodium cation-containing zeolite particles (NaZ) was added to 100 mL of a 0.005 M ammonium nitrate solution prepared by dissolving 0.04 g of ammonium nitrate ($NH_4NO_3$, 99%, Sigma-Aldrich) in approximately 100 g of deionized water. The resulting suspension was stirred in a shaking machine (SI-300R, Lab Companion) for one day to obtain an ion-exchanged sample. The obtained sample was recovered by performing centrifugation, decanting and washing with deionized water once. The recovered sample was dried and calcined at 550° C. for 12 hours at a ramp rate of 1° C./min under the airflow of 300 mL/min to prepare zeolite particles with the controlled sodium cation ratio.

Synthesis of CuNaZ(0.5)

Then, a hydrocarbon adsorption and desorption complex was prepared by impregnating 5 wt % copper into the zeolite particles with the controlled sodium cation ratio through a wet impregnation process. Specifically, a 0.04 M copper nitrate II ($Cu(NO_3)_2$) solution was prepared by dissolving copper nitrate trihydrate ($Cu(NO_3)_2 \cdot 3H_2O$, 98%, Sigma-Aldrich) in approximately 80 g of deionized water. The zeolite particles with the controlled sodium cation ratio were added to the copper nitrate solution to be finally impregnated with approximately 5 wt % Cu. Then, the mixture was put in a rotary evaporator to remove all water, and then Cu-impregnated zeolite particles (CuNaZ(0.5)) were recovered, dried at 100° C. overnight, and calcined in a boxed furnace at 550° C. for six hours at a ramp rate of 1° C./min under the airflow of 300 mL/min to prepare the hydrocarbon adsorption and desorption complex.

Example 2 (CuNaZ(0.2))

In Example 1 described above, 1 g of calcined sodium cation-containing zeolite particles (NaZ) was added to 100 mL of a 1 M ammonium nitrate solution prepared by dissolving 8 g of ammonium nitrate ($NH_4NO_3$, 99%, Sigma-Aldrich) in approximately 100 g of deionized water. The hydrocarbon adsorption and desorption complex was prepared in the same manner as in Example 1 except that the resulting suspension was stirred in the shaking machine (SI-300R, Lab Companion) for 24 hours to obtain an ion-exchanged sample.

Example 3 (CuNaZ(0.0))

In Example 1 described above, 1 g of calcined sodium cation-containing zeolite particles (NaZ) was added to 100 mL of a 1 M ammonium nitrate solution prepared by dissolving 8 g of ammonium nitrate ($NH_4NO_3$, 99%, Sigma-Aldrich) in approximately 100 g of deionized water. The process of stirring the resulting suspension in the shaking machine (SI-300R, Lab Companion) for 24 hours to obtain an ion-exchanged sample was repeated three times, and the hydrocarbon adsorption and desorption complex was prepared in the same manner as in Example 1.

Example 4 (CuNaZ(0.5)_HT)

Hydrothermal treatment for the hydrocarbon adsorption and desorption complex prepared in Example 1 was conducted through 10 mol % of $H_2O$ steam at 800° C. for 24 hours under an airflow to prepare a hydrothermal-treated hydrocarbon adsorption and desorption complex. At this time, an hourly gas flow rate of a simulated exhaust gas including water vapor to the weight of the hydrocarbon adsorption and desorption complex was 100,000 mL/g·h.

Example 5 (CuNaZ(0.2)_HT)

Hydrothermal treatment for the hydrocarbon adsorption and desorption complex prepared in Example 2 was conducted through 10 mol % of $H_2O$ steam at 800° C. for 24 hours under an airflow to prepare a hydrothermal-treated hydrocarbon adsorption and desorption complex. At this time, an hourly gas flow rate of the simulated exhaust gas including water vapor to the weight of the hydrocarbon adsorption and desorption complex is 100,000 mL/g·h.

Example 6 (CuNaZ(0.0)_HT)

Hydrothermal treatment for the hydrocarbon adsorption and desorption complex prepared in Example 3 was conducted through 10 mol % of $H_2O$ steam at 800° C. for 24 hours under an airflow to prepare a hydrothermal-treated hydrocarbon adsorption and desorption complex. At this time, an hourly gas flow rate of the simulated exhaust gas including water vapor to the weight of the hydrocarbon adsorption and desorption complex is 100,000 mL/g·h.

Comparative Example 1 (CuNaZ(1.0))

A hydrocarbon adsorption and desorption complex was prepared in the same manner as in Example 1, except that the ion exchange reaction was not performed in Example 1.

Comparative Example 2 (CuNaZ(0.8))

In Example 1 described above, 1 g of calcined sodium cation-containing zeolite particles (NaZ) was added to 100 mL of a 0.001 M ammonium nitrate solution prepared by dissolving 0.008 g of ammonium nitrate ($NH_4NO_3$, 99%, Sigma-Aldrich) in approximately 100 g of deionized water. The hydrocarbon adsorption and desorption complex was prepared in the same manner as in Example 1 except that the resulting suspension was stirred in the shaking machine (SI-300R, Lab Companion) for 24 hours to obtain an ion-exchanged sample.

Comparative Example 3 (CuNaZ(1.0)_HT)

Hydrothermal treatment for the hydrocarbon adsorption and desorption complex prepared in Comparative Example 1 was conducted through 10 mol % of $H_2O$ steam at 800° C. for 24 hours under an airflow to prepare a hydrocarbon adsorption and desorption complex. At this time, an hourly gas flow rate of the simulated exhaust gas including water vapor to the weight of the hydrocarbon adsorption and desorption complex is 100,000 mL/g·h.

Comparative Example 4 (CuNaZ(0.8)_HT)

Hydrothermal treatment for the hydrocarbon adsorption and desorption complex prepared in Comparative Example 2 was conducted through 10 mol % of $H_2O$ steam at 800° C. for 24 hours under an airflow to prepare a hydrocarbon adsorption and desorption complex. At this time, an hourly gas flow rate of the simulated exhaust gas including water vapor to the weight of the hydrocarbon adsorption and desorption complex is 100,000 mL/g·h.

Hereinafter, the hydrocarbon adsorption and desorption complex was prepared by a method different from the above.

Example 7 (CuNaZ(0.7))

Synthesis of NaZ(0.7)

First, 1 g of commercially obtained ammonium type ZSM-5 zeolite was mixed with 100 mL of 0.1 M sodium nitrate ($NaNO_3$) solution and the mixture was stirred at room temperature for 24 hours to obtain a sample. The obtained sample was recovered by performing centrifugation, decanting and washing with deionized water once. The recovered sample was dried and calcined at 550° C. for 12 hours at a ramp rate of 1° C./min under the airflow of 300 mL/min to prepare zeolite particles with the controlled sodium cation ratio.

The shape and composition of the ammonium type ZSM-5 zeolite (Si/Al=25) were confirmed through scanning electron microscope images and X-ray diffraction analysis graphs of FIG. 2. Referring to FIG. 2, it can be seen that zeolite particles having micropores on the surfaces are identified through the scanning electron microscope image, and it can be seen that the zeolite particles have an MFI-type structure through the X-ray diffraction analysis graph.

Synthesis of CuNaZ(0.7)

Then, a hydrocarbon adsorption and desorption complex was prepared by impregnating 5 wt % copper into the zeolite particles with the controlled sodium cation ratio through a wet impregnation process. Specifically, a 0.04 M copper nitrate II ($Cu(NO_3)_2$) solution was prepared by dissolving copper nitrate trihydrate ($Cu(NO_3)_2 \cdot 3H_2O$, 98%, Sigma-Aldrich) in approximately 80 g of deionized water. The zeolite particles with the controlled sodium cation ratio were added to the copper nitrate solution to be finally impregnated with approximately 5 wt % Cu. Then, the mixture was put in a rotary evaporator to remove all water, and then Cu-impregnated zeolite particles (CuNaZ(0.7)) were recovered, dried at 100° C. overnight, and calcined in a boxed furnace at 550° C. for six hours at a ramp rate of 1° C./min under the airflow of 300 mL/min to prepare a hydrocarbon adsorption and desorption complex.

Example 8 (CuNaZ(0.4))

A hydrocarbon adsorption and desorption complex was prepared in the same manner as in Example 7, except that 0.01 M sodium nitrate ($NaNO_3$) solution was used instead of 0.1 M sodium nitrate ($NaNO_3$) solution.

Example 9 (CuNaZ(0.1))

A hydrocarbon adsorption and desorption complex was prepared in the same manner as in Example 7, except that 0.001 M sodium nitrate (NaNO$_3$) solution was used instead of 0.1 M sodium nitrate (NaNO$_3$) solution.

Example 10 (CuNaZ(0))

A hydrocarbon adsorption and desorption complex was prepared in the same manner as in Example 7, except that sodium nitrate (NaNO$_3$) solution was not used.

Example 11 (CuNaZ(0.7)_HT)

Hydrothermal treatment for the hydrocarbon adsorption and desorption complex prepared in Example 7 was conducted through 10 mol % of H$_2$O steam at 800° C. for 24 hours under an airflow to prepare a hydrocarbon adsorption and desorption complex. At this time, an hourly gas flow rate of the simulated exhaust gas including water vapor to the weight of the hydrocarbon adsorption and desorption complex is 100,000 mL/g h.

Example 12 (CuNaZ(0.4)_HT)

Hydrothermal treatment for the hydrocarbon adsorption and desorption complex prepared in Example 8 was conducted through 10 mol % of H$_2$O steam at 800° C. for 24 hours under an airflow to prepare a hydrocarbon adsorption and desorption complex. At this time, an hourly gas flow rate of the simulated exhaust gas including water vapor to the weight of the hydrocarbon adsorption and desorption complex is 100,000 mL/g h.

Example 13 (CuNaZ(0.1)_HT)

Hydrothermal treatment for the hydrocarbon adsorption and desorption complex prepared in Example 9 was conducted through 10 mol % of H$_2$O steam at 800° C. for 24 hours under an airflow to prepare a hydrocarbon adsorption and desorption complex. At this time, an hourly gas flow rate of the simulated exhaust gas including water vapor to the weight of the hydrocarbon adsorption and desorption complex is 100,000 mL/g·h.

Example 14 (CuNaZ(0)_HT)

Hydrothermal treatment for the hydrocarbon adsorption and desorption complex prepared in Example 10 was conducted through 10 mol % of H$_2$O steam at 800° C. for 24 hours under an airflow to prepare a hydrocarbon adsorption and desorption complex. At this time, an hourly gas flow rate of the simulated exhaust gas including water vapor to the weight of the hydrocarbon adsorption and desorption complex is 100,000 mL/g·h.

Comparative Example 5 (CuNaZ(1.1))

A hydrocarbon adsorption and desorption complex was prepared in the same manner as in Example 7, except that in Example 7, a 1.0 M sodium nitrate (NaNO$_3$) solution was used instead of a 0.1 M sodium nitrate (NaNO$_3$) solution and was repeatedly stirred three times.

Comparative Example 6 (CuNaZ(1.1)_HT)

Hydrothermal treatment for the hydrocarbon adsorption and desorption complex prepared in Comparative Example 5 was conducted through 10 mol % of H$_2$O steam at 800° C. for 24 hours under an airflow to prepare a hydrocarbon adsorption and desorption complex. At this time, an hourly gas flow rate of the simulated exhaust gas including water vapor to the weight of the hydrocarbon adsorption and desorption complex is 100,000 mL/g·h.

EXPERIMENTAL EXAMPLE

Experimental Example 1—Elemental Analysis Results

Elemental analysis of the hydrocarbon adsorption and desorption complexes of Examples 1 to 14 and Comparative Examples 1 to 6 was performed to confirm the elemental ratio of the hydrocarbon adsorption and desorption complex according to the present disclosure, and the results are shown in Tables 1 and 2.

TABLE 1

| Sample | | Si/Al | Na/Al | Cu wt % |
|---|---|---|---|---|
| Comparative Example 1 | CuNaZ(1.0) | 28.3 ± 0.7 | 1.0 ± 0.1 | 4.6 ± 0.3 |
| Comparative Example 2 | CuNaZ(0.8) | 26.6 ± 1.2 | 0.8 ± 0.0 | 4.1 ± 0.7 |
| Comparative Example 3 | CuNaZ(1.0)_HT | 23.5 ± 2.0 | 1.1 ± 0.0 | 4.7 ± 0.2 |
| Comparative Example 4 | CuNaZ(0.8)_HT | 26.7 ± 2.6 | 0.9 ± 0.1 | 5.4 ± 1.1 |
| Example 1 | CuNaZ(0.5) | 24.4 ± 1.7 | 0.5 ± 0.1 | 4.2 ± 0.1 |
| Example 2 | CuNaZ(0.2) | 25.4 ± 0.9 | 0.2 ± 0.0 | 4.8 ± 0.4 |
| Example 3 | CuNaZ(0) | 25.5 ± 2.9 | 0.0 ± 0.0 | 4.9 ± 0.3 |
| Example 4 | CuNaZ(0.5)_HT | 24.9 ± 0.6 | 0.4 ± 0.0 | 4.8 ± 0.2 |
| Example 5 | CuNaZ(0.2)_HT | 28.6 ± 1.3 | 0.2 ± 0.1 | 4.3 ± 0.2 |
| Example 6 | CuNaZ(0)_HT | 28.8 ± 1.8 | 0.0 ± 0.1 | 4.4 ± 0.2 |

TABLE 2

| Sample | | Si/Al | Na/Al | Cu wt % |
|---|---|---|---|---|
| Example 7 | CuNaZ(0.7) | 26.0 ± 2.4 | 0.7 ± 0.1 | 4.7 ± 0.2 |
| Example 8 | CuNaZ(0.4) | 24.9 ± 1.3 | 0.3 ± 0.1 | 4.5 ± 0.0 |
| Example 9 | CuNaZ(0.1) | 25.8 ± 0.5 | 0.1 ± 0.1 | 4.9 ± 0.5 |
| Example 10 | CuNaZ(0) | 23.3 ± 1.9 | 0.0 ± 0.0 | 4.8 ± 0.2 |
| Example 11 | CuNaZ(0.7)_HT | 23.0 ± 1.5 | 0.7 ± 0.0 | 4.7 ± 0.4 |
| Example 12 | CuNaZ(0.4)_HT | 26.5 ± 0.9 | 0.3 ± 0.1 | 4.6 ± 0.3 |
| Example 13 | CuNaZ(0.1)_HT | 26.2 ± 1.7 | 0.1 ± 0.1 | 4.6 ± 0.3 |
| Example 14 | CuNaZ(0)_HT | 22.0 ± 1.4 | 0.0 ± 0.0 | 4.7 ± 0.1 |
| Comparative Example 5 | CuNaZ(1.1) | 24.3 ± 2.5 | 1.0 ± 0.1 | 4.6 ± 0.7 |
| Comparative Example 6 | CuNaZ(1.1)_HT | 25.4 ± 1.5 | 1.1 ± 0.1 | 4.8 ± 0.6 |

Referring to Tables 1 and 2, the Si/Al molar ratio, Na/Al molar ratio, and Cu supported amount of the HC trap according to the present disclosure, which was obtained by carrying out ion exchange reaction on sodium cation-containing zeolite (Na-form ZSM-5) and supporting copper therein, were confirmed through elemental analysis. The Na/Al molar ratio was controlled through an ion exchange reaction. Specifically, it can be seen that although the Si/Al molar ratio and copper content of Examples and Comparative Examples did not differ significantly, the Na/Al molar ratio varies depending on the ion exchange reaction time.

Experimental Example 2

In order to confirm the adsorbed amount of hydrocarbons and a hydrocarbon treatment efficiency with respect to the molar ratio of sodium to aluminum and with or without copper support, in the hydrocarbon adsorption and desorption complex according to the present disclosure, the cold start test (CST) for Comparative Example 1 (CuNaZSM-5), Example 3 (CuHZSM-5), sodium cation-containing zeolite (NaZSM-5) and hydrogen cation-containing zeolite (HZSM-5) was performed, and the results are shown in FIG. 3.

In the cold start test, a simulated exhaust gas feed of 100 mL/min was flowed to 0.06 g of zeolite particles that had been pre-treated at 600° C. for 30 minutes under the conditions of 30 mL/min He. At this time, the simulated exhaust gas feed composition was 100 ppm propene, 100 ppm toluene, 1 mol % oxygen (02), and 10 mol % water vapor ($H_2O$), balanced with helium (He), totaling 100 mL/min, where feed/weight=100,000 mL/g·h, and was exposed at 70° C. for five minutes, proceeded with a temperature increase condition of 53° C./min for 10 minutes, and then exposed at 600° C. for five minutes, and then the adsorption and desorption behavior of propene, toluene, and total hydrocarbons of hydrocarbons were confirmed through mass spectrometry and gas chromatography.

The adsorbed amount was calculated as the adsorbed amount of propene and toluene until the concentration of the released propene equals the concentration of injected propene and toluene (inlet concentration, 100 ppm).

FIG. 3 shows graphs of the cool start test results for the hydrocarbon adsorption and desorption complex according to the present disclosure and the hydrocarbon adsorption and desorption complex of Comparative Examples. Referring to FIG. 3, the concentrations of propene, toluene and total hydrocarbons of Example 3, Comparative Example 1, sodium cation-containing zeolite (NaZSM-5) and hydrogen cation-containing zeolite (HZSM-5) during the cool start section may be confirmed. Specifically, in the case of the sodium cation-containing zeolite (NaZSM-5) and the hydrogen cation-containing zeolite (HZSM-5), it was confirmed that propene was not adsorbed. On the other hand, in the case of toluene, it was confirmed that toluene was adsorbed to approximately 150° C. and then released. In the case of Example 3 and Comparative Example 1 supporting copper, it was confirmed that referring to (a1) and (a2) of FIG. 3, Example 3 showed similar results to the sodium cation-containing zeolite before 300° C., and referring to (b1) and (b2) of FIG. 2, Example 3 showed that, unlike the hydrogen cation-containing zeolite, propene was adsorbed and the desorbed amount of toluene was reduced. In the case of the copper-supported HC trap, propene and toluene were not detected at a temperature of 300° C. or higher, which may be seen that this was a result caused by the copper oxide formed during the copper-supporting process.

Experimental Example 3

In order to confirm the hydrocarbon adsorption performance with respect to the molar ratio of sodium to aluminum in the zeolite of the hydrocarbon adsorption and desorption complex according to the present disclosure, a cold start test (CST) for the HC traps prepared in Examples 1 to 5 and Comparative Examples 1 to 4 was performed, and the results are shown in FIGS. 4 to 12.

The adsorbed amount was calculated as the adsorbed amount of hydrocarbons until the released propene concentration equals the concentration of injected hydrocarbon (inlet concentration, 100 ppm), and the hydrocarbon treatment efficiency was expressed by calculating the ratio of the concentration (In-Out) of adsorbed and oxidized hydrocarbons to the concentration (In) of the injected hydrocarbon, which indicated hydrocarbon emissions up to 300° C. where TWC starts to work.

FIG. 4 shows graphs of cool start test results for propene and toluene of the hydrocarbon adsorption and desorption complexes according to the present disclosure and the hydrocarbon adsorption and desorption complexes of Comparative Examples. Specifically, (a) is a graph of propene adsorption and desorption in the cool start tests for the fresh hydrocarbon adsorption and desorption complexes of Examples 1 to 3 and Comparative Examples 1 and 2, (b) is a graph of propene adsorption and desorption in the cool start tests for the hydrocarbon adsorption and desorption complexes of Examples 4 to 6 and Comparative Examples 3 and 4 that are subjected to hydrothermal treatment (hydrothermally-treated hydrocarbon adsorption and desorption complexed), (c) is a graph of toluene adsorption and desorption in the cool start tests for the hydrothermally-treated hydrocarbon adsorption and desorption complexes of Examples 1 to 3 and Comparative Examples 1 and 2, and (d) is a graph of toluene adsorption and desorption in the cool start test for the hydrothermally-treated hydrocarbon adsorption and desorption complexes of Examples 4 to 6 and Comparative Examples 3 and 4.

Referring to FIG. 4, it can be confirmed that the adsorbed amount increased as the molar ratio of sodium to aluminum (Na/Al) of the hydrocarbon adsorption and desorption complex decreased, and in particular, the adsorbed amount was the most excellent when the molar ratio of sodium to aluminum was 0.5. In addition, it can be seen that in the case of the hydrothermally-treated HC trap, the adsorbed amount was not higher than that of the fresh HC trap, but Examples 4 to 6 adsorbed propene and toluene even after hydrothermal treatment. However, it can be seen that Comparative Examples 3 and 4 adsorbed only toluene without adsorbing propene.

FIG. 5 shows graphs of cool start test results for propene and toluene of the hydrocarbon adsorption and desorption complexes according to the present disclosure and the hydrocarbon adsorption and desorption complexes of Comparative Examples. Specifically, (a) is a graph of propene adsorption and desorption in the cool start tests for the hydrothermally-treated hydrocarbon adsorption and desorption complexes of Examples 7 to 10 and Comparative Example 5, (b) is a graph of propene adsorption and desorption in the cool start tests for the hydrothermally-treated hydrocarbon adsorption and desorption complexes of Examples 11 to 14 and Comparative Example 6, (c) is a graph of toluene adsorption and desorption in the cool start test for the hydrothermally-treated hydrocarbon adsorption and desorption complexes of Examples 7 to 10 and Comparative Example 5, and (d) is a graph of toluene adsorption and desorption in the cool start tests for the hydrothermally-treated hydrocarbon adsorption and desorption complexes of Examples 11 to 14 and Comparative Example 6.

Referring to FIG. 5, in the case of the fresh hydrocarbon adsorption and desorption complexes (Examples 7 to 10 and Comparative Example 5), the adsorbed amount increased as the molar ratio of sodium to aluminum (Na/Al) decreased. It can be seen that, when hydrothermal treatment was performed on each hydrocarbon adsorption and desorption complex (Examples 11 to 14 and Comparative Example 6), the adsorbed amount was not higher than that in the fresh hydrocarbon adsorption and desorption complex, but Examples 11 to 14 adsorbed propene and toluene even after hydrothermal treatment. However, it can be seen that Comparative Example 6 adsorbed only toluene without adsorbing propene. It was confirmed that among these, in the case of propene, the adsorbed amount was the most excellent when the molar ratio of sodium to aluminum was 0.4 (Example 12), and in the case of toluene, the adsorbed amount was the most excellent when the molar ratio of sodium to aluminum was 0.7 (Example 11).

FIG. 6 shows graphs of cool start test results for the total hydrocarbons of the hydrocarbon adsorption and desorption complex according to the present disclosure and the HC traps of Comparative Examples. Specifically, (a) is a graph of total hydrocarbon adsorption and desorption in the cool start tests for the fresh hydrocarbon adsorption and desorption complexes of Examples 1 to 3 and Comparative Examples 1 and 2, and (b) is a graph of total hydrocarbon adsorption and desorption in the cool start tests for the hydrothermally-treated hydrocarbon adsorption and desorption complexes of Examples 4 to 6 and Comparative Examples 3 and 4.

Referring to FIG. 6, it can be seen that the total hydrocarbon adsorbed amount increased as the molar ratio of sodium to aluminum of the hydrocarbon adsorption and desorption complex decreased, and it can be seen that in the case of hydrothermal treatment, the adsorbed amount was not higher than that in the fresh HC traps, but the total hydrocarbons are adsorbed even after hydrothermal treatment.

FIG. 7 shows graphs of cool start test results for the total hydrocarbons of the hydrocarbon adsorption and desorption complex according to the present disclosure and the HC traps of Comparative Examples. Specifically, (a) is a graph of total hydrocarbon adsorption and desorption in the cool start tests for the fresh hydrocarbon adsorption and desorption complexes of Examples 7 to 10 and Comparative Example 5, and (b) is a graph of total hydrocarbon adsorption and desorption in the cool start tests for the hydrothermally-treated hydrocarbon adsorption and desorption complexes of Examples 11 to 14 and Comparative Example 6.

Referring to FIG. 7, it can be seen that the total hydrocarbon adsorbed amount increased as the molar ratio of sodium to aluminum of the hydrocarbon adsorption and desorption complex decreased, and it can be seen that in the case of hydrothermal treatment, the adsorbed amount was not higher than that in the fresh HC traps, but hydrocarbons are adsorbed even after hydrothermal treatment.

FIG. 8 shows graphs of cool start test results for carbon dioxide and carbon monoxide of the hydrocarbon adsorption and desorption complex according to the present disclosure and the hydrocarbon adsorption and desorption complexes of Comparative Examples. Specifically, (a) is a graph of change in the amount of carbon dioxide in the cool start tests for the fresh hydrocarbon adsorption and desorption complexes of Examples 7 to 10 and Comparative Example 5, (b) is a graph of change in the amount of carbon dioxide in the cool start tests for the hydrothermally-treated hydrocarbon adsorption and desorption complexes of Examples 11 to 14 and Comparative Example 6, (c) is a graph of change in the amount of carbon monoxide in the cool start tests for the hydrothermally-treated hydrocarbon adsorption and desorption complexes of Examples 7 to 10 and Comparative Example 5, and (d) is a graph of change in the amount of carbon monoxide in the cool start test for the hydrothermally-treated hydrocarbon adsorption and desorption complexes of Examples 11 to 14 and Comparative Example 6. The graphs of FIG. 8 were measured through MS, and the temperature at which oxidation starts was designated based on the time when 200 ppm of $CO_2$ is released.

Referring to FIG. 8, it can be seen that the amount of carbon dioxide and carbon monoxide produced increased as the molar ratio of sodium to aluminum of the hydrocarbon adsorption and desorption complex decreased, and in particular, it can be confirmed that when the Na/Al value is 0.7 or less, carbon dioxide and carbon monoxide were produced in relatively large amounts. In addition, it can be seen that in the case of hydrothermal treatment, the amount of carbon monoxide and carbon dioxide produced was significantly lower than that in the fresh HC trap.

FIG. 9 shows graphs of the adsorption and desorption efficiency and adsorbed amounts of propene and toluene before reaching 300° C. with respect to a molar ratio of sodium to aluminum and with or without hydrothermal treatment, in the hydrocarbon adsorption and desorption complex according to the present disclosure. The graphs of FIG. 9 are graphs in which the toluene, propene, and total hydrocarbon treatment efficiencies are summarized according to Na/Al values.

Referring to FIG. 9, the first graph shows the hydrocarbon treatment efficiency of the hydrocarbon adsorption and desorption complex with respect to the molar ratio of sodium to aluminum, where it can be seen that the hydrocarbon treatment efficiency was excellent as the molar ratio of sodium to aluminum decreased. In particular, it can be seen that in the case of the hydrothermal-treated complex, the efficiency was highest when the molar ratio of sodium to aluminum was 0.5, and the efficiency decreased as the molar ratio decreased. The second graph shows the adsorbed amount of propene of the hydrocarbon adsorption and desorption complex with respect to the molar ratio of sodium to aluminum, where it can be seen that the adsorbed amount of propene increased as the molar ratio of sodium to aluminum decreased and the fresh complex generally exhibited a better adsorbed amount. The third graph shows the adsorbed amount of toluene of the hydrocarbon adsorption and desorption complex with respect to the molar ratio of sodium to aluminum, where it can be seen that the adsorbed amount of toluene is greatest when the molar ratio of sodium to aluminum was 0.5 and the fresh complex exhibited a better adsorbed amount.

FIG. 10 shows graphs of a treatment efficiency of propene, toluene, and the total hydrocarbons before reaching 300° C. with respect to a molar ratio of sodium to aluminum and with or without hydrothermal treatment, in the hydrocarbon adsorption and desorption complex according to the present disclosure. The graphs of FIG. 10 are graphs in which the toluene, propene, and total hydrocarbon treatment efficiencies are summarized according to Na/Al values.

Referring to FIG. 10, the graph shows the hydrocarbon treatment efficiency of the hydrocarbon adsorption and desorption complex with respect to the molar ratio of sodium to aluminum, where it can be seen that the hydrocarbon treatment efficiency was excellent as the molar ratio of sodium to aluminum decreased. In particular, it can be confirmed that when the molar ratio of sodium to aluminum was 0 to 0.7, the hydrocarbon treatment efficiency was better than that at 1.1.

FIG. 11 shows a graph of the total hydrocarbon adsorbed amount and onset oxidation temperature of the hydrocarbon adsorption and desorption complexes according to the present disclosure and the hydrocarbon adsorption and desorption complexes of Comparative Examples, the graph of Comparative Examples 1 to 4 and Examples 1 to 6 in which the molar ratio of sodium to aluminum was controlled by replacing sodium cations with hydrogen cations. The x-axis of the graph of FIG. 11 represents the value of calculated data of the total hydrocarbon adsorbed amount obtained through a flame ionized detector (GC), and the y-axis represents the onset oxidation temperature, indicating the temperature at a point where the amount of $CO_2$ produced relative to the total hydrocarbons becomes 5% or more.

Referring to FIG. 11, it can be confirmed that the hydrocarbon adsorption and desorption complex of Example 3 exhibited the lowest onset oxidation temperature by exhibiting the onset oxidation temperature of approximately 200° C. while exhibiting the highest adsorbed amount of hydrocarbons. Specifically, it can be seen that the hydrocarbon adsorption and desorption complexes of Examples 1 to 3 exhibited an onset oxidation temperature of approximately 200° C. to 210° C. and had a higher onset oxidation temperature as the molar ratio of sodium to aluminum increased. In addition, it can be seen that in the case of the hydrothermally-treated hydrocarbon adsorption and desorption complexes, the onset oxidation temperature rose compared to those not subjected to hydrothermal treatment, but in the hydrocarbon adsorption and desorption complexes of Examples 4 to 6, oxidation proceeded to a certain level or more at a temperature of approximately 240° C., which was a lower temperature than in Comparative Examples. Accordingly, it can be seen that the hydrocarbon adsorption and desorption complex of the embodiment had a small size of copper oxide particles acting on hydrocarbon oxidation, and thus had the lowest hydrocarbon oxidation temperature. In addition, it can be confirmed that the HC traps of Examples 1 to 3 exhibited a hydrocarbon adsorption amount of 0.33 $mmol_{CH4}$/g or more and exhibited a higher adsorbed amount of hydrocarbons than the hydrocarbon adsorption and desorption complexes of Comparative Examples even when hydrothermal treatment was performed.

FIG. 12 shows a graph of the total hydrocarbon adsorbed amount and onset oxidation temperature of the hydrocarbon adsorption and desorption complex according to the present disclosure and the hydrocarbon adsorption and desorption complexes of Comparative Examples, the graph of Comparative Examples 5 and 6 and Examples 7 to 14, in which the molar ratio of sodium to aluminum was controlled by replacing hydrogen cations with sodium cations. The x-axis of the graph of FIG. 12 represents the value of calculated data of the total hydrocarbon adsorbed amount obtained through a flame ionized detector (GC), and the y-axis represents the onset oxidation temperature, indicating the temperature at a point where the amount of $CO_2$ produced relative to the total hydrocarbons becomes 5% or more.

Referring to FIG. 12, it can be confirmed that the hydrocarbon adsorption and desorption complex of Example 9 exhibited the lowest onset oxidation temperature by exhibiting the onset oxidation temperature of approximately 180° C. while exhibiting a relatively adsorbed amount of hydrocarbons. Specifically, it can be seen that the hydrocarbon adsorption and desorption complexes of Examples 7 to 10 exhibited an onset oxidation temperature of approximately 180° C. to 220° C. and had a higher onset oxidation temperature as the molar ratio of sodium to aluminum increased. In addition, it can be seen that in the case of the hydrothermal-treated hydrocarbon adsorption and desorption complexes, the onset oxidation temperature rose compared to those not subjected to hydrothermal treatment, but in the hydrocarbon adsorption and desorption complexes of Examples 13 and 14, oxidation proceeded at a temperature of 210° C. to 230° C., which was a lower temperature than in Comparative Examples. Accordingly, it can be seen that the hydrocarbon adsorption and desorption complex of the embodiment had a small size of copper oxide particles acting on hydrocarbon oxidation, and thus had the lowest hydrocarbon oxidation temperature. In addition, it can be confirmed that the HC traps of Examples 7 to 10 exhibited a hydrocarbon adsorption amount of 0.35 $mmol_{CH4}$/g or more and exhibited a higher adsorbed amount of hydrocarbons than the hydrocarbon adsorption and desorption complexes of Comparative Examples even when hydrothermal treatment was performed.

Therefore, it can be seen that the hydrocarbon adsorption and desorption complex according to the present disclosure improved hydrothermal stability by controlling the molar ratio of sodium to aluminum of the zeolite particles and impregnating copper, and adsorbed a large amount of hydrocarbons and oxidized hydrocarbons at temperatures lower than the three-way catalyst activation temperature by lowering the temperature at which oxidation is performed.

The invention claimed is:

1. A hydrocarbon adsorption and desorption complex comprising:
  zeolite particles containing cations;
  metal ions chemically bounded to the zeolite particles; and
  metal oxides provided on outer surface of the zeolite particles,
  wherein the cations include cations of at least one of sodium and hydrogen, and a molar ratio of sodium to aluminum (Na/Al) of the zeolite particles is 0.7 or less, and
  wherein the hydrocarbon adsorption and desorption complex satisfies the following Formula 1:

$$\left[1 - \frac{Q_{Out}}{Q_{In}}\right] \times 100 > A \quad (1)$$

where
  $Q_{In}$ represents a total amount of hydrocarbons injected into the hydrocarbon adsorption and desorption complex,
  $Q_{Ou}$ represents a total amount of hydrocarbons released through the hydrocarbon adsorption and desorption complex, and
  A is a number of 40, and represents a hydrocarbon treatment efficiency.

2. The hydrocarbon adsorption and desorption complex of claim 1, wherein the zeolite particles are zeolite socony mobil-5 (ZSM-5) zeolite particles.

3. The hydrocarbon adsorption and desorption complex of claim 1, wherein the hydrocarbon adsorption and desorption complex further includes a hydrothermal-treated hydrocarbon adsorption and desorption complex obtained by hydrothermally treating the hydrocarbon adsorption and desorption complex using 5 to 15 mol % of water vapor at 600° C. to 900° C. for one hour to 36 hours, and
  wherein, for the hydrothermal-treated hydrocarbon adsorption and desorption complex, A in Formula 1 is a number of 5 or more.

4. The hydrocarbon adsorption and desorption complex of claim 1, wherein a size of the hydrocarbon adsorption and desorption complex is 50 to 5000 nm, and
  wherein a size of the metal oxides is 1 to 10 nm.

5. The hydrocarbon adsorption and desorption complex of claim 1, wherein the metal ions are chemically bounded to inside pores formed in the zeolite particles.

6. The hydrocarbon adsorption and desorption complex of claim 1, wherein the hydrocarbon adsorption and desorption complex
exhibits adsorption of hydrocarbons at a temperature of 300° C. or lower, and
exhibits oxidation of hydrocarbons at a temperature of 180° C. or higher.

7. The hydrocarbon adsorption and desorption complex of claim 1, wherein an adsorbed amount of hydrocarbons of the hydrocarbon adsorption and desorption complex is 0.32 to 1.5 $\text{mmol}_{CH4}/g$, and
wherein a hydrocarbon oxidation start temperature of the hydrocarbon adsorption and desorption complex is 180 to 350° C.

8. The hydrocarbon adsorption and desorption complex of claim 1, wherein the metal ions are cations of metals selected from the group consisting of elements of Groups 3 to 12, and
wherein the metal oxides are oxides of metals selected from the group consisting of elements of Groups 3 to 12.

9. The hydrocarbon adsorption and desorption complex of claim 8, wherein the metal ions include cations of metals selected from the group consisting of iron, cobalt, nickel, copper, zinc, rhodium, and cadmium, and
wherein the metal oxides are oxides of metals selected from the group consisting of iron, cobalt, nickel, copper, zinc, rhodium, and cadmium.

10. A preparation method for a hydrocarbon adsorption and desorption complex, comprising:
controlling a cation ratio of zeolite particles by using an ion exchange method; and
forming metal ions and metal oxides by mixing the zeolite particles with the controlled cation ratio with a solution containing the metal ions,
wherein in the controlling of the cation ratio, a molar ratio of sodium to aluminum (Na/Al) of the zeolite particles is controlled to 0.7 or less, and
wherein the hydrocarbon adsorption and desorption complex satisfies the following Formula 1:

$$\left[1 - \frac{Q_{Out}}{Q_{In}}\right] \times 100 > A \quad (1)$$

where
$Q_{In}$ represents a total amount of hydrocarbons injected into the hydrocarbon adsorption and desorption complex,
$Q_{Ou}$ represents a total amount of hydrocarbons released through the hydrocarbon adsorption and desorption complex, and
A is a number of 40, and represents a hydrocarbon treatment efficiency.

11. The preparation method for a hydrocarbon adsorption and desorption complex of claim 10, wherein the controlling of the cation ratio includes mixing the zeolite particles with an ammonium salt aqueous solution or a sodium salt aqueous solution,
wherein the ammonium salt aqueous solution contains any one or more selected from the group consisting of ammonium sulfate, ammonium nitrate, ammonium chloride, ammonium acetate, ammonium persulfate, aqueous ammonia, ammonium bicarbonate, and ammonium formate, and
wherein the sodium salt aqueous solution contains any one or more selected from the group consisting of sodium nitrate, sodium chloride, sodium acetate, sodium persulfate, sodium bicarbonate, and sodium formate.

12. The preparation method for a hydrocarbon adsorption and desorption complex of claim 10, wherein a wet impregnation method is used in the forming of the metal ions and the metal oxides.

13. The preparation method for a hydrocarbon adsorption and desorption complex of claim 10, further comprising, after the forming of the metal ions and the metal oxides, performing hydrothermal treatment by injecting 5 to 15 mol % of water vapor at a temperature of 600° C. to 900° C. for one hour to 36 hours,
wherein an hourly gas flow rate of a simulated exhaust gas including water vapor to a weight of the hydrocarbon adsorption and desorption complex is 10,000 to 200,000 mL/g·h.

14. The preparation method for a hydrocarbon adsorption and desorption complex of claim 10, wherein the metal ions include cations of metals selected from the group consisting of elements of Groups 3 to 12.

15. A hydrocarbon adsorption and desorption complex for vehicles comprising the hydrocarbon adsorption and desorption complex according to claim 1.

* * * * *